(12) United States Patent
Di Vittorio et al.

(10) Patent No.: US 12,291,067 B2
(45) Date of Patent: May 6, 2025

(54) VEHICLE PROVIDED WITH A SUSPENSION AND AN ELECTROMECHANICAL ROTARY DEVICE FOR CONTROLLING THE SUSPENSION, AND METHOD FOR CONTROLLING MOTION OF A VEHICLE SUSPENSION

(71) Applicant: MARELLI SUSPENSION SYSTEMS ITALY S.P.A., Corbetta (IT)

(72) Inventors: Marco Di Vittorio, Turin (IT); Giordano Greco, Turin (IT); Simone Marchetti, Turin (IT); Piero Monchiero, Turin (IT); Nicola Amati, Alpignano (IT); Salvatore Circosta, Gioiosa Ionica (IT); Renato Galluzzi, San Benigno Canavese (IT); Andrea Tonoli, Avigliana (IT)

(73) Assignee: MARELLI SUSPENSION SYSTEMS ITALY S.p.A., Corbetta (IT)

( * ) Notice: Subject to any disclaimer, the term of this patent is extended or adjusted under 35 U.S.C. 154(b) by 0 days.

(21) Appl. No.: 17/999,758

(22) PCT Filed: May 27, 2021

(86) PCT No.: PCT/IB2021/054623
§ 371 (c)(1),
(2) Date: Nov. 23, 2022

(87) PCT Pub. No.: WO2021/240415
PCT Pub. Date: Dec. 2, 2021

(65) Prior Publication Data
US 2023/0234417 A1    Jul. 27, 2023

(30) Foreign Application Priority Data
May 27, 2020   (IT) .................... 102020000012553

(51) Int. Cl.
*B60G 17/015* (2006.01)
*B60G 13/14* (2006.01)
*B60R 16/033* (2006.01)

(52) U.S. Cl.
CPC .......... *B60G 17/0157* (2013.01); *B60G 13/14* (2013.01); *B60G 2202/22* (2013.01);
(Continued)

(58) Field of Classification Search
CPC ............ B60G 17/0157; B60G 2202/42; B60G 2204/4191; B60G 2204/421;
(Continued)

(56) References Cited

U.S. PATENT DOCUMENTS

| 10,166,833 B2 | 1/2019 | Groen et al. |
| 2007/0151780 A1* | 7/2007 | Tonoli .................. B60G 21/007 280/124.134 |

(Continued)

FOREIGN PATENT DOCUMENTS

| DE | 10043711 A1 | 5/2002 |
| DE | 102010035087 A1 | 2/2012 |

(Continued)

OTHER PUBLICATIONS

International Search Report and Written Opinion of the International Searching Authority for PCT International Application No. PCT/IB2021/054623 mailed Sep. 14, 2021.
(Continued)

*Primary Examiner* — Timothy Wilhelm
(74) *Attorney, Agent, or Firm* — Howard & Howard Attorneys PLLC

(57) ABSTRACT

A vehicle is provided which has a vehicle body, at least one hub of a wheel, and a suspension connecting the hub to the vehicle body. The suspension has a suspension arm hinged to the vehicle body and to the hub, a spring, and an (Continued)

electromechanical rotary actuator operable between an active adjustment condition and a damping condition of the motion of the suspension, via a leverage.

15 Claims, 8 Drawing Sheets

(52) U.S. Cl.
CPC .... *B60G 2202/42* (2013.01); *B60G 2202/442* (2013.01); *B60G 2204/20* (2013.01); *B60G 2204/4191* (2013.01); *B60G 2204/421* (2013.01); *B60G 2204/424* (2013.01); *B60G 2400/0516* (2013.01); *B60G 2400/202* (2013.01); *B60G 2500/104* (2013.01); *B60G 2600/182* (2013.01); *B60G 2800/916* (2013.01); *B60R 16/033* (2013.01); *B60Y 2400/86* (2013.01)

(58) Field of Classification Search
CPC ........ B60G 2500/104; B60G 2600/182; B60G 16/033; B60G 2202/22; B60G 2204/20; B60G 2204/424; B60G 2400/0516; B60G 2400/202; B60G 2800/916; B60G 13/14; B60Y 2400/86
See application file for complete search history.

(56) References Cited

U.S. PATENT DOCUMENTS

| 2007/0152499 | A1* | 7/2007 | Tonoli | B60T 13/741 |
| | | | | 303/20 |
| 2007/0273198 | A1* | 11/2007 | Tonoli | F16D 65/18 |
| | | | | 303/3 |
| 2016/0311287 | A1 | 10/2016 | Groen et al. | |

FOREIGN PATENT DOCUMENTS

| DE | 102014118107 A1 * | 6/2016 | |
| DE | 102014225284 A1 | 6/2016 | |
| DE | 102016213195 A1 | 1/2018 | |
| DE | 102017221585 A1 * | 6/2019 | |
| EP | 0363158 A2 | 4/1990 | |
| EP | 1798123 A1 * | 6/2007 | ............ B60T 13/741 |
| WO | 2018172762 A1 | 9/2018 | |

OTHER PUBLICATIONS

Written Opinion of the International Preliminary Examining Authority for PCT International Application No. PCT/IB2021/054623 mailed Apr. 22, 2022.
International Preliminary Report on Patentability for PCT International Application No. PCT/IB2021/054623 dated Sep. 2, 2022.
Search Report for Italian Patent Application No. 202000012553 dated Feb. 16, 2021.

* cited by examiner

VEHICLE PROVIDED WITH A SUSPENSION AND AN ELECTROMECHANICAL ROTARY DEVICE FOR CONTROLLING THE SUSPENSION, AND METHOD FOR CONTROLLING MOTION OF A VEHICLE SUSPENSION

CROSS-REFERENCE TO RELATED APPLICATIONS

The present application is a National Stage of International Patent Application No. PCT/IB2021/054623, filed May 27, 2021, which claims priority to and all the benefits of Italian Patent Application No. 102020000012553, filed on May 27, 2020 both of which are hereby expressly incorporated herein by reference in its entirety.

BACKGROUND OF THE INVENTION

1. Field of Invention

The present invention relates, in general, to the automotive sector and, in particular, to a vehicle equipped with a suspension and an electromechanical rotary device for controlling the suspension, and to a method for adjusting motion of a vehicle suspension.

2. Description of Related Art

Solutions are known where the suspension of a vehicle is associated with an electromechanical rotary device for active control and/or damping of its motion.

A first example of prior art solutions is represented by U.S. Ser. No. 10/166,833 B2, which describes an electromechanical device which actuates a torsion bar, connected in turn to the wheel hub or to one of the suspension arms through a kinematic mechanism.

Disadvantageously, the prior art device cannot be used to actuate the motion of the wheels at high frequency (F>5 Hz), nor to dampen the motion of the suspension, since the presence of an element with low rigidity (and therefore subject to high elastic deformations), such as the torsion bar, placed in series in the torque transmission chain, considerably lowers the passband of the system, acting as a low pass filter.

For these reasons, the device may only be used to control the movements of the vehicle at low frequency, i.e., those of the body of the vehicle (rolling, pitching, shaking). Furthermore, to allow adequate damping of the motion of the vehicle suspension, the device must be placed in parallel with a traditional shock absorber.

A second example of the prior art is represented by the hydraulic rotary actuator of German patent DE10043711, wherein two different architectures are described. In the first architecture, the hydraulic rotary actuator is attached to the vehicle body and interacts with one of the suspension arms through a system consisting of a lever and a rod. In the second architecture, the hydraulic rotary actuator is supported directly on one of the suspension arms via an elastic suspension consisting of an articulated parallelogram or a pantograph and a spring; the actuator may thus oscillate vertically with respect to the arm of the suspension, forming an oscillating mass, which dampens the vibrations of the wheel. The transmission of the torque between the hydraulic rotary actuator and the vehicle body is achieved via a kinematic mechanism consisting of a lever and a rod.

Both architectures allow an active control of rolling and pitching motions of the vehicle, and a control of the damping of the vertical oscillations of the wheels. Also this example, therefore, concerns only an active control of the low frequency motions of the vehicle body (roll and pitch), whereas for the high frequency motions of the suspension only the possibility of damping the high frequency motions is described.

Furthermore, while for the second architecture damping of the wheel oscillations occurs mainly by exploiting the dynamic effect of the oscillating mass, consisting of the hydraulic rotary actuator elastically suspended relative to the suspension arm, for the first architecture no details are specified on how the hydraulic rotary actuator may be used and controlled in order to dampen said oscillations, resulting in the description of this aspect being completely vague and valid only theoretically. In particular, no details are provided on the structural features of the hydraulic rotary actuator. For example, it is not specified at any point whether this actuator consists of a hydraulic actuator directly driven by an electric motor, in turn controlled by suitable electronics, or if it consists of a hydraulic rotary jack connected to hydraulic accumulation elements through suitable controlled solenoid valves. Furthermore, no detail is given on the principles and logics at the vehicle dynamics level, on the basis of which the hydraulic rotary motor is controlled.

An example of an actuator configured to actively impart motion to the suspension is also known from WO 2018/172762. However, this solution does not consider the possibility of the actuator operating in damping, since all the steps in which the suspension is stressed (that is, when the wheel encounters a raised obstacle or a dip) provide for an active intervention of the actuator.

Therefore, based on the examples available in the prior art, it is not possible to configure a suspension, wherein the high frequency motions are alternately actively inducible and subject to damping.

SUMMARY OF THE INVENTION

The object of the present invention is to overcome the aforementioned problems.

To this end, a vehicle is provided which is equipped with a suspension to which is associated an electromechanical rotary device, capable of controlling its movement at the high frequencies typical of vertical wheel movements (F>5 Hz), allowing it both to cause high frequency movements of the suspension and at the same time to dampen the high-frequency movements of the suspension induced by external causes (road irregularities, maneuvers such as braking, acceleration, cornering), braking the motions of the suspension electrically and possibly transforming the kinetic energy from the motion of the suspension into electrical energy (regenerative damping).

According to an embodiment of the present invention, the electromechanical rotary device comprises an electric machine (expediently, a traditional electric motor, known per se to a person skilled in the art in the context of similar applications) coupled with a reduction gear, the output of which is connected rigidly, via a kinematic mechanism of a known kind, to one of the elements of the suspension which moves together with the wheel hub. This element may be one of the suspension arms, the wheel hub, or the structural part that supports the spring plate of the suspension. The output of the reduction gear is connected to one of the suspension elements, which moves together rigidly with the wheel hub, i.e., without the interposed elastic components subject to high deformations, such as torsion bars, elastic components deformable by flexure, or elastic components deformable under traction and compression. In effect, only in this way is it possible to keep the passband of the device above the high frequencies typical of vertical wheel movements (F>5 Hz), and therefore to both cause and dampen the movement of the suspension in this range of frequencies at the same time.

For a front double wishbone suspension, a particularly expedient kinematic mechanism is one where the rotary device has its housing connected to the vehicle body, near the chassis attachment point of the lower arm of the suspension, and a lever, which is part of the kinematic mechanism and integral with the reduction gear, has its axis of rotation parallel to the axis of rotation of the hinge that connects the lower arm of the suspension to the chassis and is connected by means of a hinge to a rod, which in turn is connected via a hinge to the structural element that supports the suspension spring plate. The structural element may be a traditional shock absorber that performs a damping action on the suspension motions by acting in parallel with the electromechanical rotary device or an element that does not perform any damping action, constituting only a cylindrical pair for supporting the spring plate of the suspension, in which case the only damping action of the suspension motions is performed by the electromechanical rotary device. This implementation is particularly expedient since it allows installation of the electromechanical rotary device without upsetting the classic architecture of the double wishbone suspension.

The housing of the electromechanical rotary device may be rigidly connected to the vehicle body, for example with screws, or it may be connected to the vehicle body by interposing a suspension on elastic and damping means (for example, support blocks or wedges) of known implementation, in order to reduce the transmission of vibrations toward the vehicle body. The rigidity and damping values of the elastic and damping means are ideally assigned in such a way as not to introduce dynamics into the frequency band of interest, which for an automotive suspension is indicatively comprised in the frequency range from 0 Hz to 50 Hz. In practice, the elastic means must have a sufficiently high rigidity, while the damping elements may be explicitly required or not, depending on the performance required in terms of vibration filtering.

The reduction gear is expediently made in the form of a multi-stage planetary gear train, wherein the input of each stage is the sun gear, and the output of each stage is the planet carrier, and wherein the outer ring is fixed and integral with the housing of the device.

The electric machine may be controlled in position and torque by an electronic control unit (inverter), which controls the electric machine according to known strategies for controlling vehicle dynamics, with the aim of reducing shaking, rolling, and pitching movements of the body of the vehicle and at the same time reducing the vertical vibrations of the wheels, based on sensors connected thereto, known per se, and able to measure the magnitude of the vertical movement of the wheel hub and the vehicle body. As an example of application, these sensors may consist of two accelerometers, capable of measuring the vertical acceleration of the point to which they are connected, positioned integral with the lower arm of the suspension and at the point of connection with the body of the suspension spring (dome), respectively. Another possible solution is to use an accelerometer integral with a point on the vehicle body and a travel sensor of the suspension.

The electronic control unit is electrically connected to an electrical energy storage element (battery), from which the electrical energy is drawn to power the electric machine during the steps wherein the electric machine causes a movement of the suspension (active operation), or to which the electric energy regenerated by the electric machine is directed during the steps wherein the electric machine brakes the movement of the suspension (damping step, preferably regenerative).

The electronic control unit may be a component external to the electromechanical rotary device, and therefore positioned inside the vehicle at a considerable distance from said device, or it may be completely integrated within the electromechanical device, constituting an extension in the axial direction of the electric machine. In the latter case, a so-called "smart actuator" type architecture, well known to a person skilled in the art, would essentially be implemented, wherein basically all the components necessary for the operation of the suspension are integrated into said suspension, except for the electrical wiring for connecting to the rest of the vehicle (for example, to power the electrical and electronic devices incorporated in the suspension).

Furthermore, the angular position sensor, traditionally integrated in the electric machine in order to provide the torque and velocity control of the electric machine, may be used as a travel sensor of the suspension within the known vehicle dynamics control strategies. This is possible because, the motion transmission mechanism from the wheel hub to the electric machine of the electromechanical rotary device being rigid, there is a unique kinematic link between the relative position of the wheel hub with respect to the vehicle body and the rotation of the electric machine. This would make it possible to eliminate the known position/acceleration sensors, which in the known art are used to measure the relative motion of the wheel hub with respect to the vehicle body with a resulting reduction in costs and installation complexity.

The aforesaid and other objects and advantages are achieved, according to an aspect of the invention, by a vehicle and a method having the features defined in the appended claims. Preferred embodiments of the invention are also described.

BRIEF DESCRIPTION OF THE DRAWINGS

The functional and structural features of some preferred embodiments of a vehicle and a method according to the present invention will now be described. Reference is made to the appended drawings, wherein.

DETAILED DESCRIPTION

Figure 1:
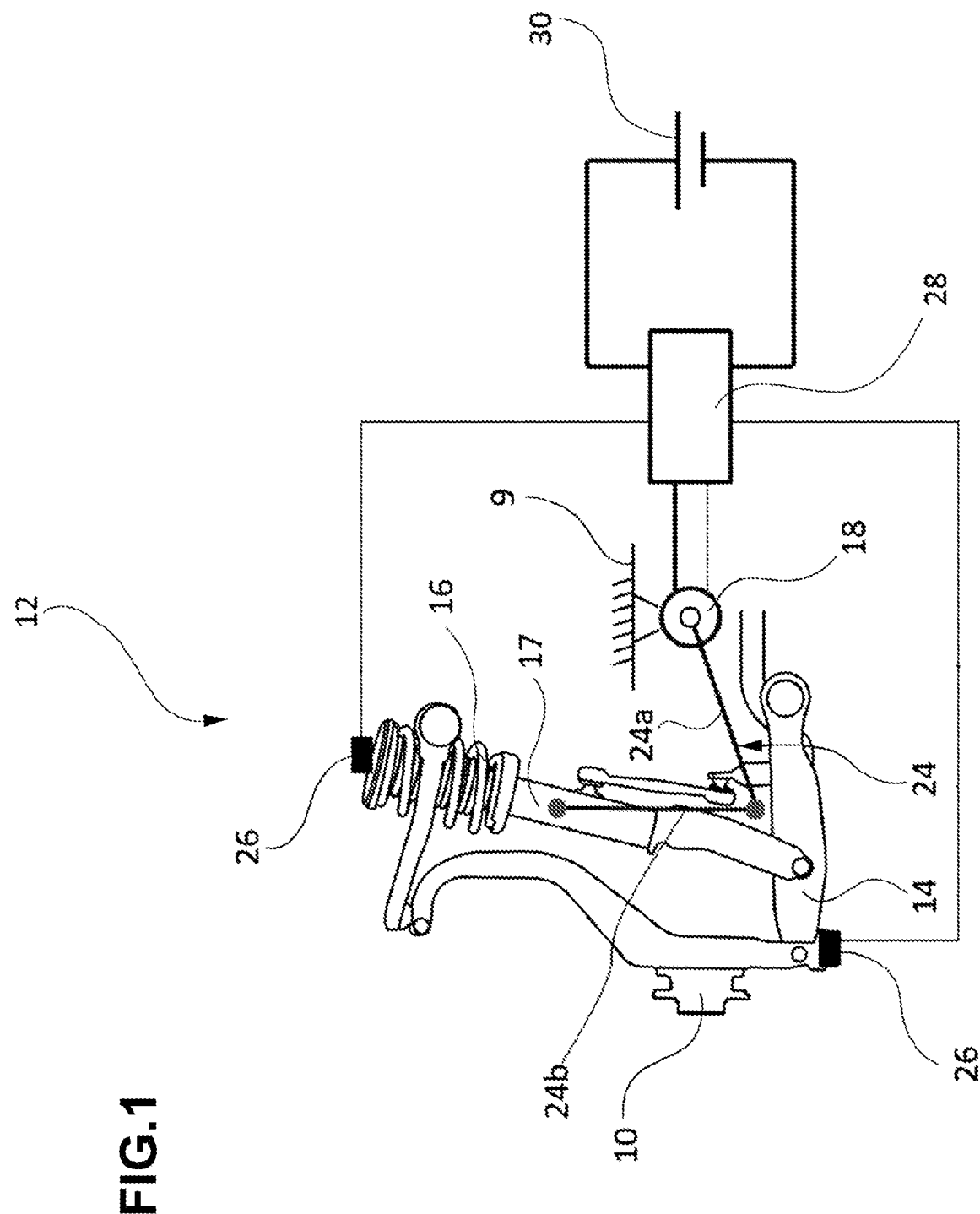
FIG. 1 is a schematic view of a suspension associated with a vehicle according to an embodiment of the present invention.

Before describing a plurality of embodiments of the invention in detail, it should be clarified that the present invention is not limited in its application to the constructional details and configuration of the components presented in the following description or illustrated in the drawings. The present invention may assume different embodiments and be implemented or constructed in practice in different ways. It should also be understood that the phraseology and terminology have a descriptive purpose and should not be construed as limiting.

Referring by way of example to the figures, a vehicle comprises a vehicle body 9, at least one hub 10, adapted to support a wheel 11, so that the wheel 11 is rotatable about the hub 10, and a suspension 12, which connects the hub 10 to the vehicle body 9, so that the hub 10 is oscillatable vertically with respect to the vehicle body 9.

The suspension 12 in turn comprises a suspension arm 14 (expediently, a traditional lower pivoting arm), hinged on one side to the vehicle body 9 and on the other side to the hub 10, and a spring 16, suitable for biasing the suspension arm 14 toward a predetermined neutral position of equilibrium of static forces with respect to the vehicle body 9 (i.e., the position that the suspension arm would have in a condition of a substantially flat ground under the action of the weight force acting on the vehicle body 9).

An electromechanical rotary actuator 18, integrally connected to the vehicle body 9, comprises an electric machine 20 coupled to a reduction gear 22, the reduction gear 22 comprising at least one reduction stage 23a, 23b, coupled to an output shaft 23c having its axis of rotation parallel to the hinge axis of the suspension arm 14 to the vehicle body 9.

The suspension 12 further comprises a leverage 24, adapted to transfer the motion from the at least one reduction stage 23a, 23b to the suspension arm 14 by the output shaft 23c of the reduction stage 23a, 23b, the leverage 24 and output shaft 23c of the reduction stage 23a, 23b comprising (or being formed by) components substantially configured as rigid bodies (i.e., rigid torsion, flexure, traction, and compression components), without prejudice to the possibility that said components may be articulated with each other. This is different from the prior art, where torsion bars or other elements are used, configured to transmit motion from the reduction gear to the suspension arm specifically by means of their torsional, flexural, traction, or compression elastic deformations.

Also provided are one or more sensors 26, adapted to detect parameters indicative of a motion of the suspension arm 14; an electronic control unit 28, adapted to control the electric machine 20 of the electromechanical rotary actuator 18 in torque and angular position based on signals transmitted from the one or more sensors 26; and a battery 30, adapted to alternately power the electromechanical rotary actuator 18 and to receive electric current therefrom.

The electromechanical rotary actuator 18 is operable between an active adjustment condition, wherein the electromechanical rotary actuator 18 is configured to be electrically powered by the battery 30 and to transmit a force to the suspension arm 14, via the leverage 24, which is to cause the relative motion of said suspension arm 14 with respect to the vehicle body 9, performing positive work on the suspension 12, and a damping condition, wherein the electromechanical rotary actuator 18 is configured to electrically power the battery 30 and to transmit to the suspension arm 14, via the leverage 24, a force which opposes the relative motion of the suspension arm 14 with respect to the vehicle body 9, performing negative work on the suspension 12.

The electromechanical rotary actuator 18 may be operated between the active adjustment and damping conditions on command by the electronic control unit 28, in such a way as to impart a motion to the suspension arm 14 with a maximum frequency higher than 5 Hz, or to dampen a motion of the suspension arm 14 with a maximum frequency higher than 5 Hz (for example, a wheel motion with a frequency on the order of 10-15 Hz), respectively. This may be expediently obtained via the one or more sensors 26 which, by detecting the vertical movements of the suspension arm 14 and transmitting them to the electronic control unit 28, allow the electronic control unit to control the electric machine 20 of the electromechanical rotary actuator 18 in torque and angular position to impart to the suspension arm 14 a motion with a maximum frequency greater than 5 Hz, or to dampen a motion of said suspension arm 14 with a maximum frequency greater than 5 Hz, according to methods within the reach of the person skilled in the art.

According to a preferred embodiment, the axis of rotation of the output shaft 23c of the reduction stage 23a, 23b is parallel to and not coincident with the hinge axis of the suspension arm 14 to the vehicle body 9.

The suspension 12 may further comprise a cylindrical pair 17 (as illustrated by way of example in FIG. 1, which shows an embodiment of a front suspension of the double wishbone type), having at least two parts which are extendable telescopically to each other, one of said parts having one end connected by a joint to the suspension arm 14, and the other of said parts having one end connected by a joint to the vehicle body 9.

Alternatively (as illustrated by way of example in FIG. 2, which shows an embodiment of a rear suspension of the wishbone type), the cylindrical pair 17 may be absent.

According to an embodiment, the cylindrical pair 17 is configured to substantially avoid exerting a damping action on the motion of the suspension. In this case, the cylindrical pair 17 is substantially configured not to resist the motion of the suspension 12 (for example, it may comprise two cylindrical portions extendable telescopically with minimum friction, and in the absence of damping fluids within these cylindrical portions).

Alternatively, the cylindrical pair 17 may be configured to exert a damping action on the motion of the suspension 12, which is added to the damping action generated by the electromechanical rotary actuator 18.

In this case, the cylindrical pair 17 may be configured, for example, as a traditional automotive shock absorber.

According to an embodiment, the spring 16 is connected at one end to the part of the cylindrical pair 17 that may be attached to the vehicle body 9, and at the other end to the part of the cylindrical pair 17 attached to the suspension arm 14, the leverage 24 being connected to the part of the cylindrical pair 17 attached to the suspension arm 14 (for example, at or near a spring plate, on which one end of the spring 16 rests and is integral with the part of the cylindrical pair 17 attached to the suspension arm 14).

Preferably, the leverage 24 comprises a lever 24a, torsionally integral with the output shaft 23c of the at least one reduction stage 23a, 23b, and a rod 24b, which may be articulated with respect to the lever 24a and hinged at its other end to the suspension arm 14, or to the hub 10, or to the part of the cylindrical pair 17 attached to the suspension arm 14. The lever 24a and the rod 24b are essentially configured as rigid bodies, so as to provide a rigid kinematic mechanism for transmitting the motion between the reduction stage 23a, 23b and the suspension arm 14.

According to an embodiment, the reduction gear 22 comprises a multi-stage planetary gear train, the reduction gear 22 being accommodated in a housing of the electromechanical rotary actuator 18 integrally connected to the vehicle body 9.

Each stage 23a, 23b of the planetary gear train comprises a sun gear, which meshes with the planets of a planet carrier, in turn meshing with a radially outer ring. The planetary gear train is configured in such a way that the input of each stage is the sun gear, and the output of each stage is the planet carrier, and wherein the outer ring is fixed in rotation and integral with said housing of the electromechanical rotary actuator 18.

Expediently, the reduction gear 22 comprises a two-stage planetary gear train, wherein the planet carrier of the first stage is connected in a torsionally rigid way to the lever 24a of the leverage 24, and the sun gear of the second stage is connected in a torsionally rigid way to the shaft of the electric machine 20.

Figure 6A:
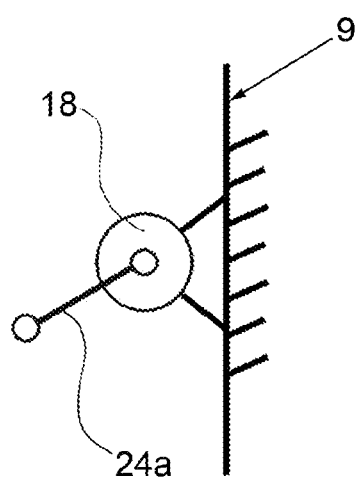
FIGS. 6A and 6B are schematic views illustrating two possible configurations for attaching the electromechanical rotary actuator to a vehicle chassis.

According to an embodiment (illustrated by way of example in FIG. 6A), the electromechanical rotary actuator 18 is rigidly connected to the vehicle body 9, for example by means of screws or the like.

Figure 6B:
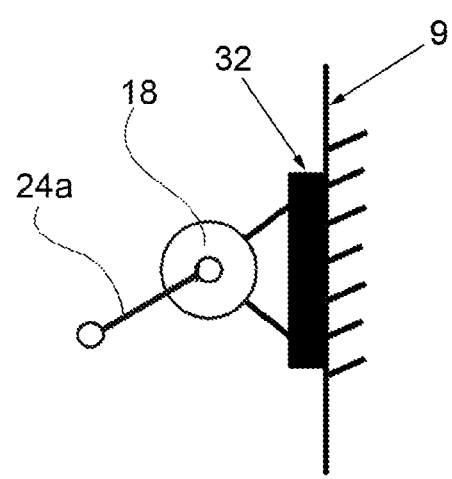

Alternatively (as illustrated by way of example in FIG. 6B), the electromechanical rotary actuator 18 may be connected to the vehicle body 9 via elastic and damping means known per se to reduce the transmission of vibrations toward the vehicle body 9. The rigidity and damping values of the elastic and damping means 32 are ideally assigned in such a way as not to introduce dynamics in the frequency band of interest, which for an automotive suspension is indicatively comprised in the frequency range from 0 Hz to 50 Hz. In practice, the elastic means must have a sufficiently high rigidity, while the damping elements may be explicitly required or not, depending on the performance required in terms of vibration filtering.

Expediently, the electronic control unit 28 is fully integrated in the electromechanical device, forming an extension in the axial direction of the electric machine 20.

According to an aspect of the present invention, a method is provided for adjusting the motion of a vehicle suspension comprising the steps of preparing a vehicle according to any of the embodiments described above, and detecting, by the one or more sensors 26, relative position and velocity between the vehicle body 9 and the hub 10.

Figure 2:
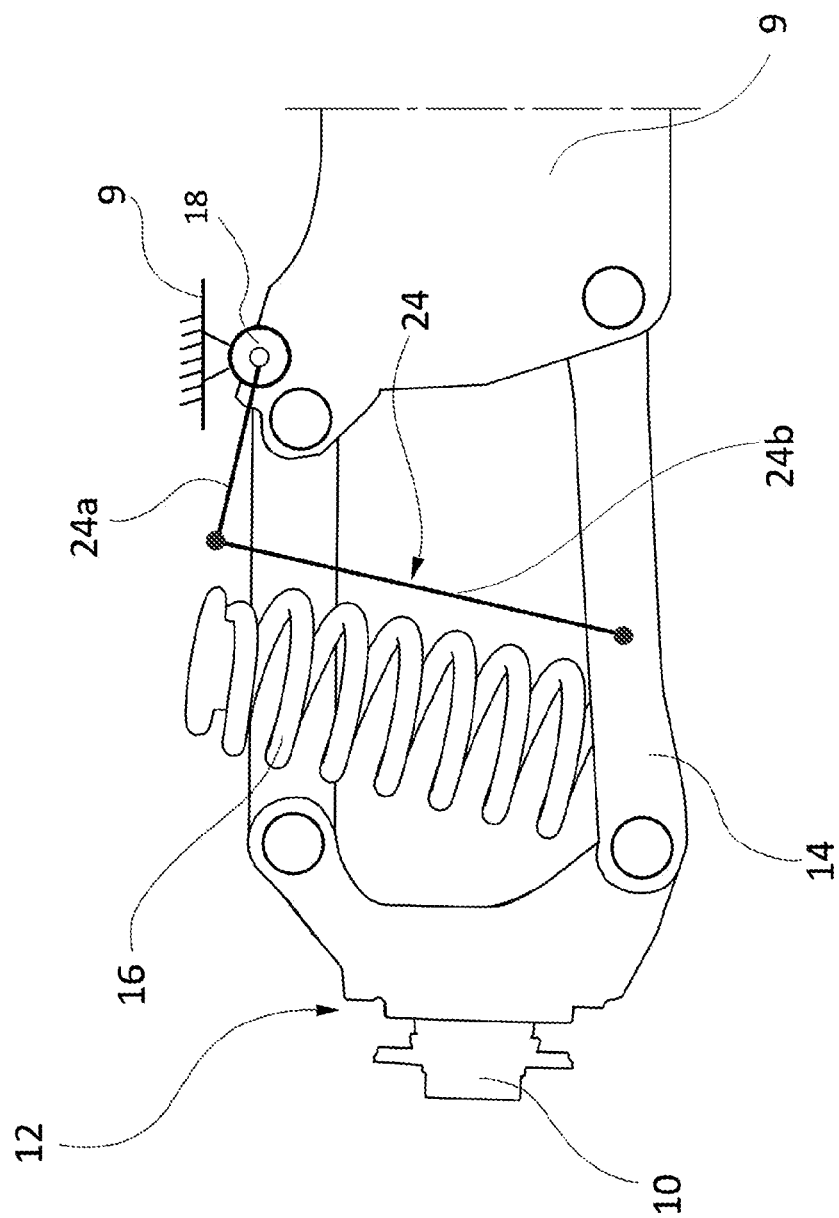
FIG. 2 is a schematic view of a suspension associated with a vehicle according to an alternative embodiment of the present invention.
Figure 3:
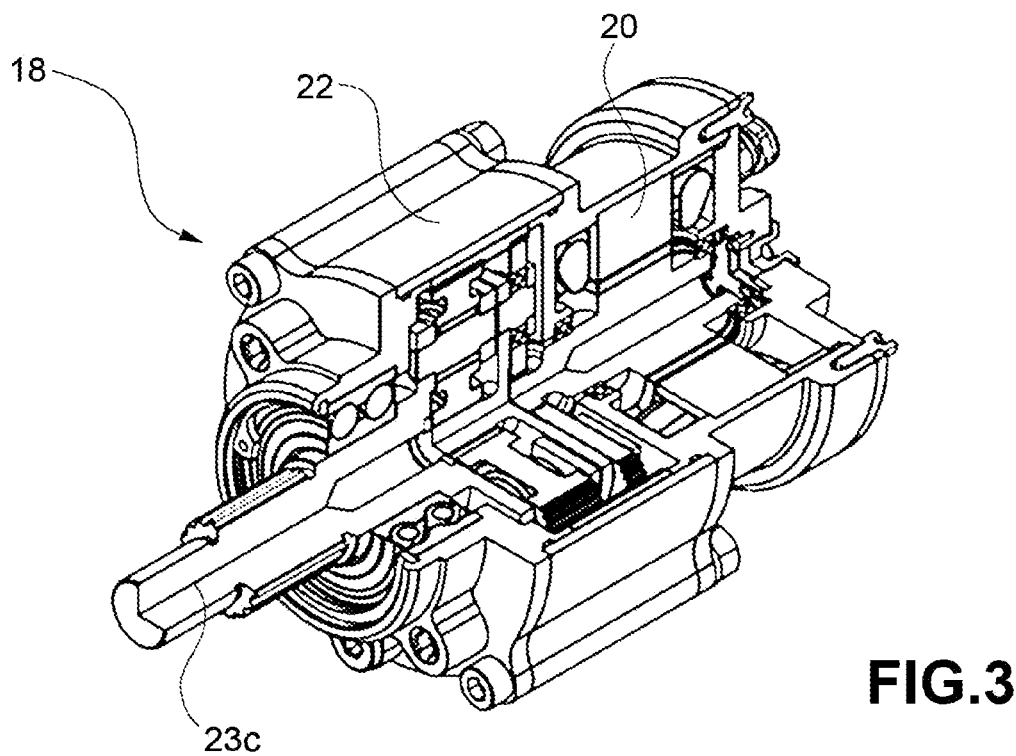
FIG. 3 is a schematic perspective view in partial cross section of an electromechanical rotary actuator included in the suspension according to an embodiment of the present invention.
Figure 4:
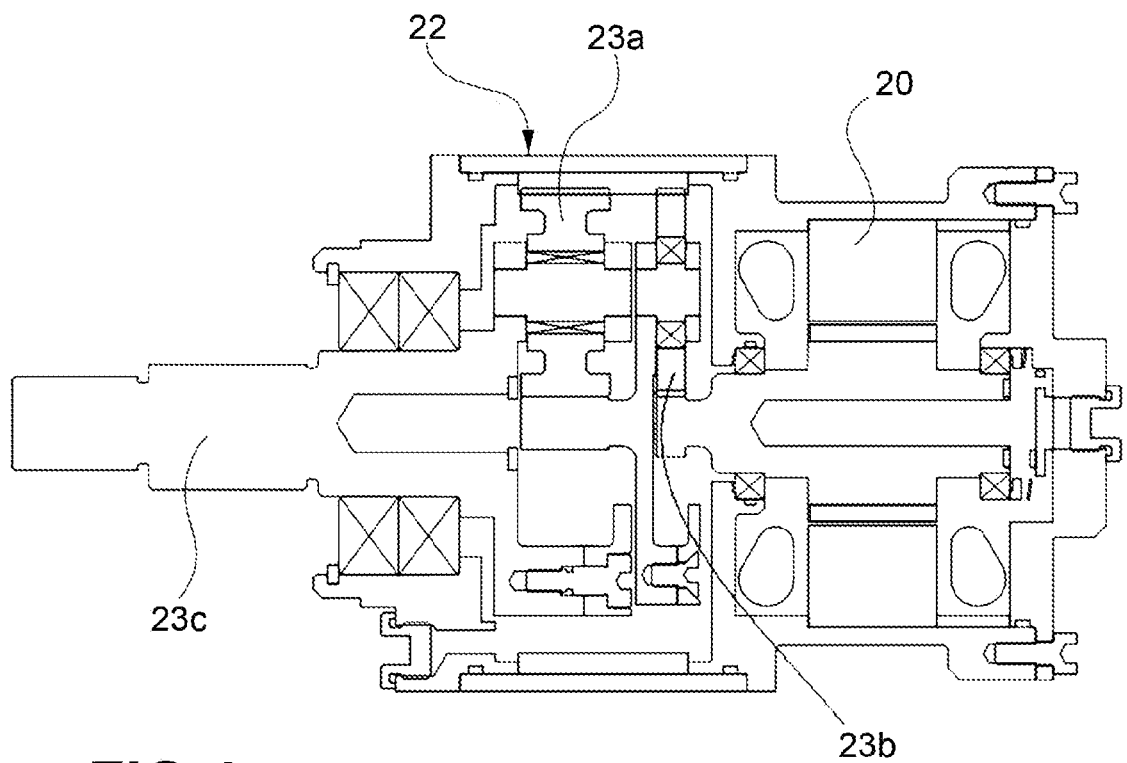
FIG. 4 is a side view in cross section of the electromechanical rotary actuator of FIG. 3.
Figure 5:
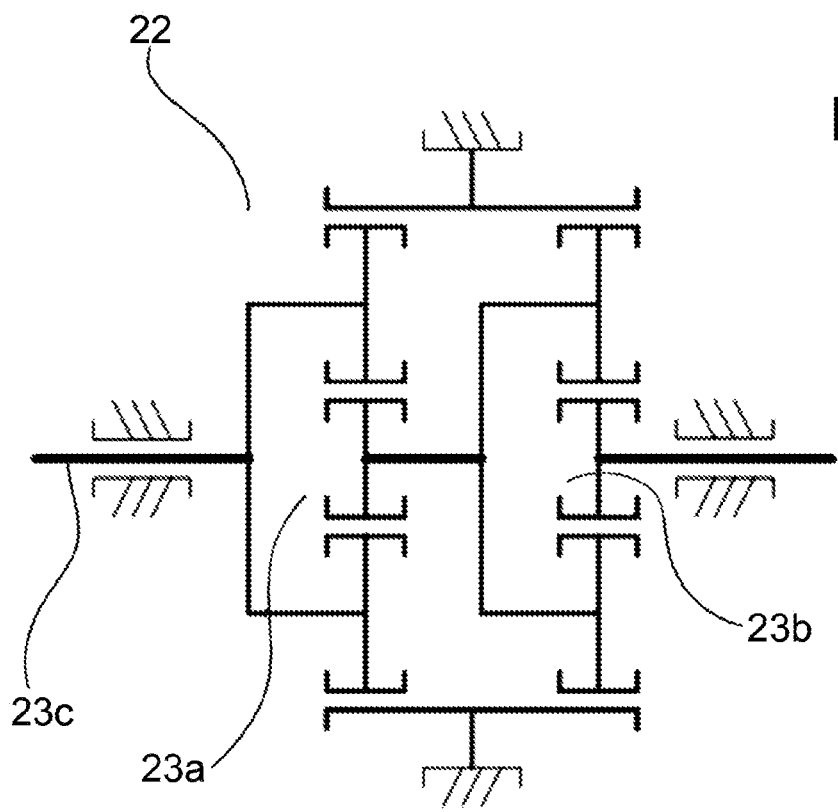
FIG. 5 is a schematic view of a reduction gear forming part of the actuator illustrated in FIG. 4.

When a reciprocal movement is detected between the vehicle body 9 and the hub 10, the method according to the invention further provides controlling, by means of the electronic control unit 28, the electromechanical rotary actuator 18 and comprises the steps of:

if the movement of the hub 10 is such that the absolute distance between the hub and the vehicle body 9 tends to decrease with respect to the absolute distance that the hub 10 would have from the vehicle body 9 in a neutral condition of equilibrium of static forces of the suspension 12 (i.e. when the wheel faces a slope, and the hub 10 rises, pivoting, clockwise from the perspective of FIGS. 1 and 2, above the neutral position), supplying the electromechanical rotary actuator 18 with electric current from the battery 30, in such a way as to generate a torque which, transmitted to the suspension arm 14 by the leverage 24, generates an action on the suspension arm 14 with a maximum frequency F>5 Hz, tending to further reduce the absolute distance between the hub 10 and the vehicle body 9 (i.e., promoting a further upward pivot of the hub), as long as the relative velocity between the hub 10 and the vehicle body 9 does not change sign, in which case interrupting the electric power supply from the battery 30 to the electromechanical rotary actuator 18, and making the electromechanical rotary actuator 18 work as a generator, transmitting the electric current produced to the battery 30;

if the movement of the hub 10 is such that the absolute distance between the hub and the vehicle body 9 tends to increase with respect to the absolute distance that the hub 10 would have from the vehicle body 9 in a neutral condition of equilibrium of static forces of the suspension 12 (i.e., when the wheel faces a descent, and the hub 10 descends, pivoting, counterclockwise from the perspective of FIGS. 1 and 2, below the neutral position), supplying the electromechanical rotary actuator 18 with electric current from the battery 30, in such a way as to generate a torque which, transmitted to the suspension arm 14 by the leverage 24, generates an action on the suspension arm 14 with a maximum frequency F>5 Hz, tending to further increase the absolute distance between the hub 10 and the vehicle body 9, as long as the relative velocity between the hub 10 and the vehicle body 9 does not change sign, in which case interrupting the electrical supply from the battery 30 to the electromechanical rotary actuator 18, and making said electromechanical rotary actuator 18 work as a generator, transmitting the electric current produced to the battery 30.

Figure 7:
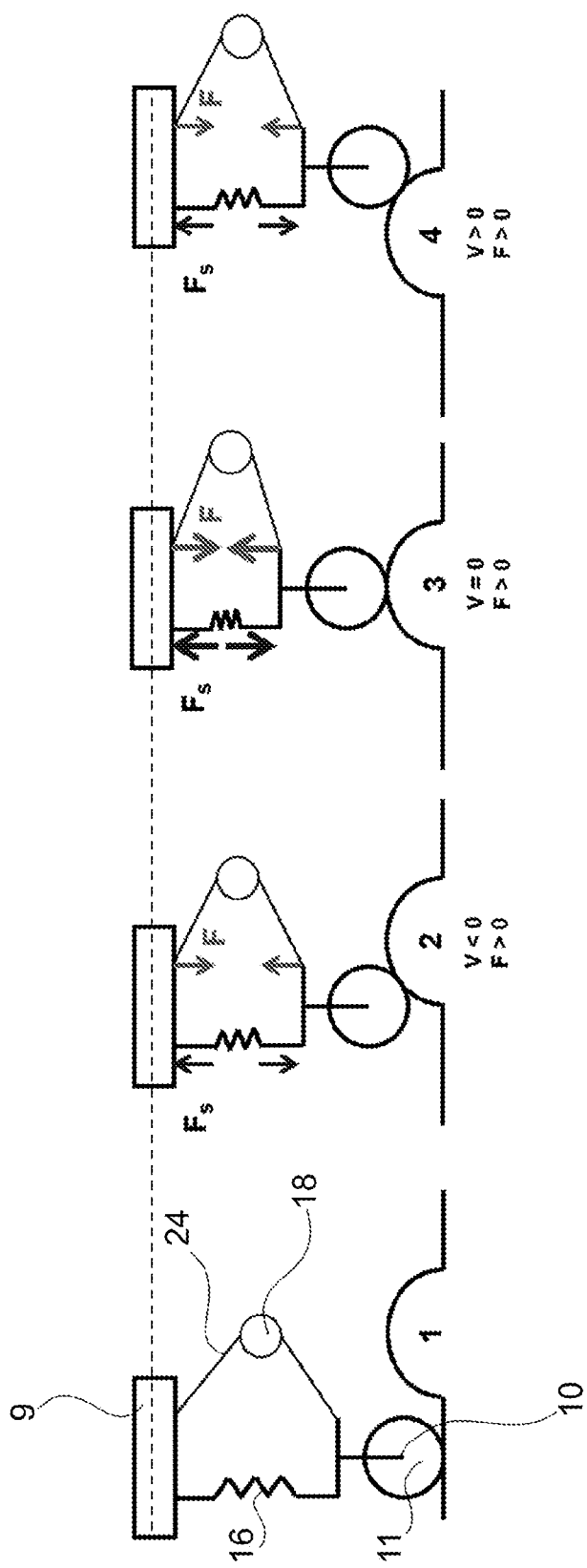
FIG. 7 schematically shows a sequence of states of a wheel-body-suspension assembly in the act of overcoming an obstacle on the road according to an embodiment of the present invention.
Figure 9:
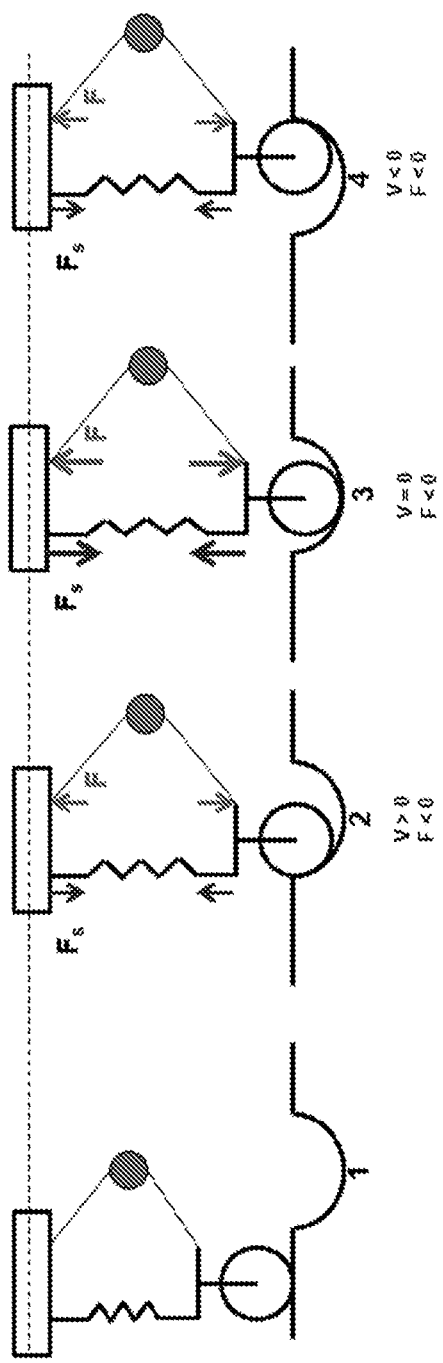
FIG. 9 schematically shows a sequence of states of a wheel-body-suspension assembly in the act of crossing a dip in the road according to an embodiment of the present invention.
Figure 10:
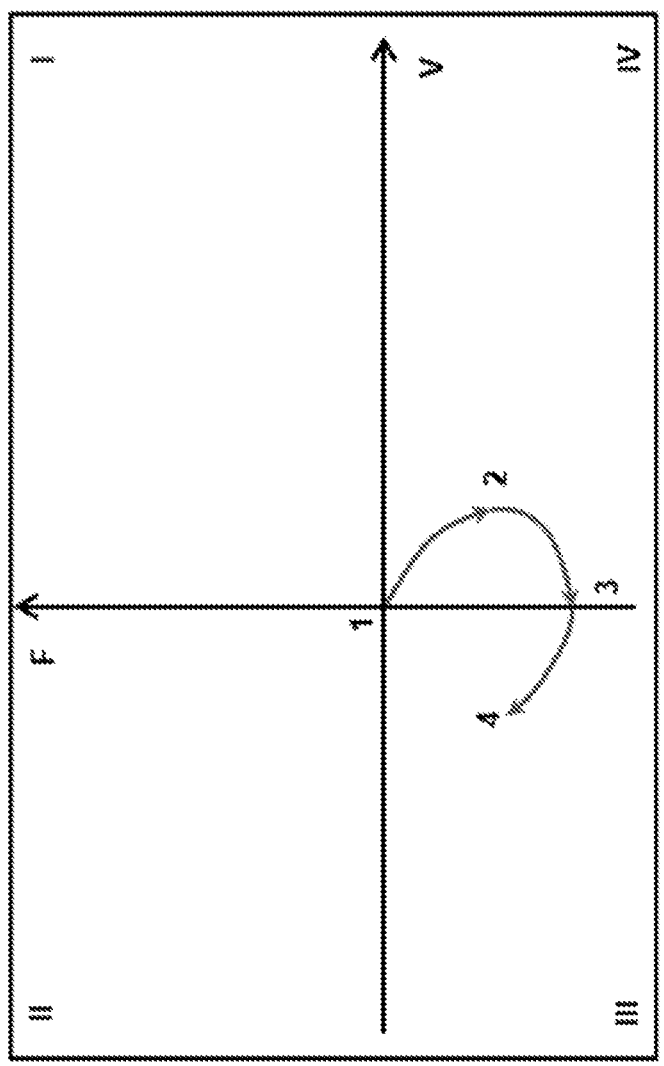
FIG. 10 is a diagram representing the force-velocity relationship of the electromechanical rotary actuator under the conditions represented in FIG. 9.

To better understand the control strategy described above, two examples of adjusting the motion of the suspension are illustrated below, with reference to FIGS. 7 and 8 (first example), and FIGS. 9 and 10 (second example).

Let us consider a simplified model of vehicle suspension (illustrated by way of example in FIG. 7 and FIG. 9), wherein the vehicle body 9 and each wheel 11 of the vehicle are schematized with two masses, an upper and a lower mass respectively, connected to each other via a spring 16 and an electromechanical rotary actuator 18 mechanically parallel to each other.

Let us consider the particular scenario, wherein the wheel collides with an obstacle on the road, for example an artificial bump. The objective of the control strategy (known per se) is to control the rotary actuator 18 in torque and in position, so as to always keep the vehicle body 9 at the same vertical height, thus compensating for the inevitable change in force of the spring 16 due to the vertical displacement of the wheel 11 with respect to the vehicle body 9 when crossing the obstacle.

Fs indicates the force that the spring exerts on the vehicle body, conventionally considered positive if directed upward, and on the wheel, conventionally considered positive if directed downward, due to the action and reaction principle. V indicates the relative vertical velocity between body and wheel, conventionally considered positive in extension. F indicates the force exerted by the rotary actuator on the body, conventionally considered positive if directed downward; by the action and reaction principle, the rotary actuator exerts a force F of the same magnitude on the wheel, which is conventionally considered positive if directed upward.

Figure 8:
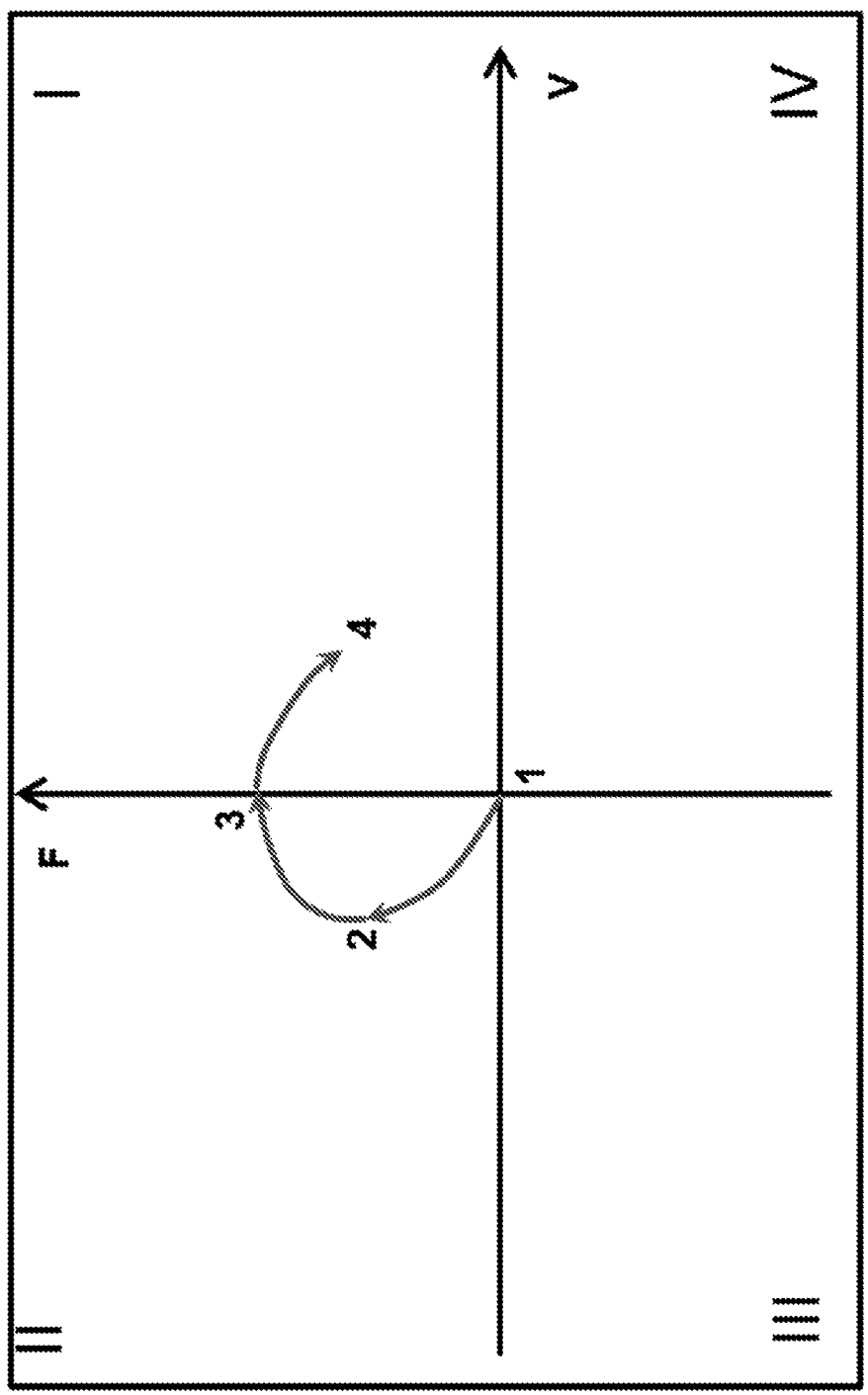
FIG. 8 is a diagram representing the force-velocity relationship of the electromechanical rotary actuator in the conditions represented in FIG. 7.

With these sign conventions, let us consider the known force F-velocity V diagram in FIG. 8, wherein the velocity V and force F of the actuator are shown. The first and third quadrant (indicated with the Roman numerals I and III) are by convention the typical operating quadrants of a shock absorber, wherein a traditional shock absorber would dissipate the kinetic energy of the suspension, and wherein the electromechanical rotary actuator of the present invention damps the motion of the suspension and, preferably, simultaneously regenerates the kinetic energy of the suspension into electrical energy, thereby providing regenerative damping and a flow of electrical energy from the actuator to the battery. The second and fourth quadrants (indicated by the Roman numerals II and IV) are by convention the operating quadrants that are not admissible for a shock absorber, since they correspond to an active operation of the suspension, respectively in compression and extension; in these two quadrants, the electromechanical rotary actuator of the present invention causes the motion of the suspension producing an absorption of electric energy from the battery, and thus creating a flow of electric energy from the battery to the actuator.

The main phenomena that occur while crossing the obstacle may be summarized as follows. In step 1 (first configuration from the left in FIG. 7) the vehicle moves on a smooth road, the suspension spring supports the vertical load due to the weight of the body, the suspension does not move vertically (V=0), and the rotary actuator exerts a zero force F. On the force-velocity plane of FIG. 8, this condition corresponds to the origin. In step 2, wherein the wheel climbs the obstacle, the control strategy aims to keep the body at the same vertical height as it had in step 1. As the wheel climbs over the obstacle and approaches the body, the suspension is in the compression step (V<0), the spring is more compressed than it was in step 1 and thus exerts an additional direct elastic force Fs on the body upward. To compensate for this force Fs, the rotary actuator must exert an equal and opposite force F on the body, thus directed downward. Due to the action and reaction principle, the rotary actuator exerts an equal and opposite force F on the wheel, thus directed upward. The actuator operates in the second quadrant of the force-velocity graph of FIG. 8, which corresponds to an active operation in compression. In practice, in this step the actuator actively "helps" the wheel to follow the bump, pulling the wheel toward the body, and without having a displacement effect on said body. In so doing, the actuator performs positive work on the suspension since the force F exerted by the actuator on the wheel and the vertical velocity of the wheel are always in the same direction during this step (the vertical velocity of the body is theoretically zero, therefore theoretically the work of the force F that the actuator exerts on the body is also zero). Note that in this situation of relative velocity V between the body and the negative wheel (compression), a shock absorber would have opposed the relative compression motion between body and wheel, thus exerting a force on the body directed upward, which would have facilitated the upward movement of the body, and thus working in the third quadrant of the force-velocity graph.

In step 3, wherein the wheel has reached the apex of the obstacle, the control strategy still has the objective of keeping the body at the same vertical height that it had in steps 1 and 2. Since the wheel is on the apex of the obstacle, the suspension has zero relative velocity (V=0), but the spring is more compressed than it was in step 2 and therefore increases the value of the elastic force Fs exerted on the body upward. To compensate for the increased force Fs, the rotary actuator must in turn increase the value of the force F that it exerts downward on the body. Due to the action and reaction principle, the rotary actuator exerts an equal and opposite force F on the wheel, thus directed upward. The actuator works at zero velocity by exerting a positive force F; therefore, it works on the ordinate axis between the first and second quadrant of the force-velocity graph of FIG. 8, which corresponds to an active operation with zero velocity. In practice, in this step the actuator continues to actively maintain the wheel on the apex of the bump, without having a vertical displacement effect on the body. In the situation of zero relative velocity V between body and wheel, a shock absorber would have reacted with zero force F, thus working in the origin of the force-velocity graph.

Finally, in step 4, wherein the wheel descends from the obstacle, once again the control strategy aims to keep the body at the same vertical height it had in steps 1 to 3. Since the wheel descends from the obstacle and moves away from the body, the suspension is in the extension step (V>0), the spring is always compressed and therefore exerts an elastic force Fs directed upward on the body. To compensate for this force Fs, the rotary actuator must exert an equal and opposite force F on the body, thus directed downward. Due to the action and reaction principle, the rotary actuator exerts an equal and opposite force F on the wheel, thus directed upward. The actuator then works in extension by exerting a force F on the body and wheel that opposes said extension, whereby the actuator is functioning as a shock absorber in the first quadrant of the force-velocity graph of FIG. 8, which corresponds to a damping operation in extension. In so doing, the actuator performs negative work on the suspension, since the force F exerted by the actuator on the wheel and the vertical velocity of the wheel are always of discordant direction during this step (the vertical velocity of the body is theoretically zero, therefore theoretically the work of the force F that the actuator exerts on the body is also zero). During this operation, the actuator then regenerates the kinetic energy of the suspension into electric energy, with a flow of electric energy going from the actuator to the battery.

Finally, let us consider a second particular scenario, wherein the wheel enters a dip on the road. Also in this case, the objective of the control strategy (known per se) is to control the rotary actuator 18 in torque and in position, so as to always keep the vehicle body 9 at the same vertical height, thus compensating for the inevitable change in force of the spring 16 due to the vertical displacement of the wheel 11 with respect to the body of the vehicle 9 when crossing the dip.

Let us consider the same conventions on the signs of forces and velocity already illustrated for the case of the artificial bump. Furthermore, let us consider the known force F-velocity V diagram in FIG. 10, which is wholly similar to that of FIG. 8, and for which the same considerations on the quadrants already illustrated for FIG. 8 apply.

The main phenomena that occur while crossing the dip may be summarized as follows. In step 1 (first configuration from the left in FIG. 9), the vehicle moves on a smooth road, the suspension spring supports the vertical load due to the weight of the body, the suspension does not move vertically (V=0), and the rotary actuator exerts a zero force F. On the force-velocity plane of FIG. 10, this condition corresponds to the origin. In step 2, wherein the wheel enters the dip, the control strategy aims to keep the body at the same vertical height that it had in step 1. As the wheel descends inside the dip and moves away from the body, the suspension is in the extension step (V>0), the spring becomes more extended than it was in step 1 and therefore exerts an additional elastic force Fs on the body directed downward. To compensate for the force Fs, the rotary actuator must exert an equal and opposite force F on the body, thus directed upward. Due to the action and reaction principle, the rotary actuator exerts an equal and opposite force F on the wheel, thus directed downward. The actuator operates in the fourth quadrant of the force-velocity graph of FIG. 10, which corresponds to an active operation in extension. In practice, in this step the actuator actively "helps" the wheel to follow the profile of the dip, pushing the wheel in the opposite direction to the body, and without having a displacement effect on said body. In so doing, the actuator performs positive work on the suspension since the force F exerted by the actuator on the wheel and the vertical velocity of the wheel are always in the same direction during this step (the vertical velocity of the body is theoretically zero, therefore theoretically the work of the force F that the actuator exerts on the body is also zero). Note that in this situation of relative velocity V between body and positive wheel (extension), a shock absorber would have opposed the relative motion of extension between body and wheel, thus exerting a force on the body directed downward, which would have facilitated the movement toward the bottom of the body, and thus working in the first quadrant of the force-velocity graph.

In step 3, wherein the wheel has reached the lowest point of the dip, the control strategy still has the objective of keeping the body at the same vertical height as it had in steps 1 and 2. Since the wheel is at the lowest point of the dip, the suspension has zero relative velocity (V=0), but the spring is more extended than it was in step 2 and therefore increases the value of the elastic force Fs exerted on the body downward. To compensate for this the increased force Fs, the rotary actuator must in turn increase the value of the force F that it exerts upward on the body. Due to the action and reaction principle, the rotary actuator exerts an equal and opposite force F on the wheel, thus directed downward. The actuator works at zero velocity by exerting a negative force F, therefore it works on the ordinate axis between the third and fourth quadrant of the force-velocity graph of FIG. 10, which corresponds to an active operation with zero velocity. In practice, in this step the actuator continues to actively keep the wheel on the lowest point of the dip, without the effect of vertical displacement on the body. Note that in this situation of zero relative velocity V between body and wheel, a shock absorber would have reacted with zero force F, thus working in the origin of the force-velocity graph.

Finally, in step 4, wherein the wheel rises out of the dip, once again the control strategy aims to keep the body at the same vertical height that it had in steps 1 to 3. As the wheel rises out of the dip and approaches the body, the suspension is in the compression step (V<0), the spring is always extended and therefore exerts an elastic force Fs directed downward on the body. To compensate for the force Fs, the rotary actuator must exert an equal and opposite force F on the body, thus directed upward. Due to the action and reaction principle, the rotary actuator exerts an equal and opposite force F on the wheel, thus directed downward. The actuator then works in compression by exerting a force F on the body and wheel that opposes said compression, so the actuator is functioning as a shock absorber in the third quadrant of the force-velocity graph of FIG. 10, which corresponds to a damping operation in compression. In so doing, the actuator performs negative work on the suspension, since the force F exerted by the actuator on the wheel and the vertical velocity of the wheel are always of discordant direction during this step (the vertical velocity of the body is theoretically zero, therefore theoretically the work of the force F that the actuator exerts on the body is also zero). During this operation, the actuator then regenerates the kinetic energy of the suspension into electric energy, with a flow of electric energy going from the actuator to the battery.

Based on the preceding explanations, it is understood how the rotary actuator passes from active operation to damping operation (expediently regenerative) on the basis of the control strategy of the vehicle dynamics described above.

In particular, both when (starting from a neutral condition of equilibrium of static suspension forces) the wheel encounters a bump, and when the wheel encounters a dip, the actuator is in a first step electrically powered by the battery to perform an active adjustment of the suspension motion until it reaches the apex of the bump, or the deepest point of the dip, after which, in a second step, the electrical power supply from the battery is interrupted and the actuator is made to work as a generator, thus functioning as a damper for the suspension.

According to an embodiment, the step of detecting relative position and velocity between the vehicle body 9 and the hub 10 is carried out by means of an angular position sensor, integrated in the electric machine 20 and adapted to allow the control in torque and velocity.

Various aspects and embodiments of a vehicle and a method according to the invention have been described. It is understood that each embodiment may be combined with any other embodiment. Furthermore, the present invention is not limited to the described embodiments, but may be varied within the scope of protection as described and claimed herein.

The invention claimed is:
1. A vehicle, comprising:
a vehicle body;
at least one hub adapted to support a wheel, whereby the wheel is rotatable about the hub; and
a suspension connecting the hub to the vehicle body, so that the hub is pivotable vertically with respect to the vehicle body, said suspension including:
a suspension arm hinged to the vehicle body and to the hub;
a spring, adapted to bias said suspension arm toward a predetermined neutral position of equilibrium of static forces with respect to the vehicle body;
an electromechanical rotary actuator, integrally connected to the vehicle body and comprising an electric machine coupled to a reduction gear, said reduction gear including at least one reduction stage comprising an output shaft having a rotation axis parallel to a hinge axis of the suspension arm to the vehicle body;
a leverage adapted to transfer motion from the at least one reduction stage to said suspension arm by said output shaft of said at least one reduction stage, said leverage and output shaft of the at least one reduction stage comprising or being formed by components configured substantially as rigid bodies;
one or more sensors adapted to detect parameters indicative of motion of the suspension arm;
an electronic control unit adapted to control torque and the angular position of the electric machine of the electromechanical rotary actuator, based on signals transmitted by the one or more sensors; and a battery adapted to power the electromechanical rotary actuator and receive electricity from the electromechanical rotary actuator;

the electromechanical rotary actuator being operable between an active adjustment condition, wherein said electromechanical rotary actuator is configured to be electrically powered by the battery and to transmit to said suspension arm, via the leverage, a force causing a relative motion of said suspension arm with respect to the vehicle body, performing a positive work on the suspension, and a damping condition, wherein said electromechanical rotary actuator is configured to electrically power the battery and transmit to said suspension arm, via the leverage, a force opposing the relative motion of said suspension arm with respect to the vehicle body, performing a negative work on the suspension;

said electromechanical rotary actuator being operable between said active adjustment condition and said damping condition on command of the electronic control unit, to respectively give motion to said suspension arm with a maximum frequency higher than 5 Hz or dampen the motion of said suspension arm with a maximum frequency greater than 5 Hz.

2. The vehicle as set forth in claim 1, further comprising a cylindrical pair, having at least two telescopically extensible parts, one part of said at least two telescopically extensible parts having one end connected by a joint to said suspension arm, and the other part of said at least two telescopically extensible parts having one end connected by a joint to the vehicle body.

3. The vehicle as set forth in claim 2, wherein the cylindrical pair is configured to avoid exerting a damping action on motion of the suspension.

4. The vehicle as set forth in claim 2, wherein the cylindrical pair is configured to exert a damping action on motion of the suspension, which adds to the damping action generated by the electromechanical rotary actuator.

5. The vehicle as set forth in claim 4, wherein the cylindrical pair is configured as a traditional automotive shock absorber.

6. The vehicle as set forth in claim 2, wherein the spring is connected at a first end thereof to the part of the cylindrical pair attachable to the vehicle body, and at a second end thereof to the part of the cylindrical pair attached to the suspension arm, the leverage being connected to the part of the cylindrical pair attached to the suspension arm.

7. The vehicle as set forth in claim 2, wherein the leverage comprises a lever, torsionally integral with the output shaft of the at least one reduction stage, and a rod, articulated with respect to the lever and hinged at one end to one of the suspension arm, the hub, or the part of the cylindrical pair attached to the suspension arm, said lever and rod being configured as rigid bodies.

8. The vehicle as set forth in claim 1, wherein the reduction gear comprises a multi-stage planetary gear train, said reduction gear being accommodated in a housing of the electromechanical rotary actuator integrally attached to the vehicle body, each stage of said planetary gear train comprising a sun gear that meshes with planets of a planet carrier, the planets of the planet carrier meshing with a radially external ring gear, said planetary gear train being configured whereby an input of each stage is the sun gear and an output of each stage is the planet carrier, and wherein the radially external ring gear is fixed in rotation and integral with said housing of the electromechanical rotary actuator.

9. The vehicle as set forth in claim 8, wherein the reduction gear comprises a two-stage planetary gear train, wherein the planet carrier of the first stage is connected to the leverage in a torsionally rigid manner, and the sun gear of the second stage is connected to the output shaft of the electric machine in a torsionally rigid manner.

10. The vehicle as set forth in claim 1, wherein the electromechanical rotary actuator is connected to the vehicle body by elastic and damping means.

11. The vehicle as set forth in claim 1, wherein the electronic control unit is completely integrated inside the electromechanical rotary actuator, forming an extension in an axial direction of the electric machine.

12. The vehicle as set forth in claim 1, wherein an axis of rotation of the output shaft of the at least one reduction stage is parallel and does not coincide with the hinge axis of the suspension arm to the vehicle body.

13. A method for adjusting motion of a vehicle suspension, the method comprising the steps of:

a) providing a vehicle comprising:
a vehicle body;
at least one hub, adapted to support a wheel, whereby the wheel is rotatable about the hub; and
a suspension connecting the hub to the vehicle body, so that the hub is pivotable vertically with respect to the vehicle body, said suspension comprising:
a suspension arm hinged to the vehicle body and to the hub;
a spring adapted to bias said suspension arm toward a predetermined neutral position of equilibrium of static forces with respect to the vehicle body;
an electromechanical rotary actuator, integrally connected to the vehicle body and comprising an electric machine coupled to a reduction gear, said reduction gear including at least one reduction stage comprising an output shaft having a rotation axis parallel to a hinge axis of the suspension arm to the vehicle body;
a leverage adapted to transfer motion from the at least one reduction stage to said suspension arm by said output shaft of said at least one reduction stage, said leverage and output shaft of the at least one reduction stage comprising or being formed by components configured substantially as rigid bodies;
one or more sensors adapted to detect parameters indicative of motion of the suspension arm;
an electronic control unit adapted to control torque and the angular position of the electric machine of the electromechanical rotary actuator, based on signals transmitted by the one or more sensors; and
a battery adapted to power the electromechanical rotary actuator and receive electricity from the electromechanical rotary actuator;

the electromechanical rotary actuator being operable between an active adjustment condition, wherein said electromechanical rotary actuator is configured to be electrically powered by the battery and to transmit to said suspension arm, via the leverage, a force causing a relative motion of said suspension arm with respect to the vehicle body, performing a positive work on the suspension, and a damping condition, wherein said electromechanical rotary actuator is configured to electrically power the battery and transmit to said suspension arm, via the leverage, a force opposing the relative motion of said suspension arm with respect to the vehicle body, performing a negative work on the suspension;

said electromechanical rotary actuator being operable between said active adjustment condition and said damping condition on command of the electronic control unit, to respectively give motion to said suspension arm with a maximum frequency higher than 5 Hz or dampen the motion of said suspension arm with a maximum frequency greater than 5 Hz;

b) detecting, through the one or more sensors, relative position and relative velocity between the vehicle body and the hub;

c) when a mutual movement is detected between the vehicle body and the hub by the electronic control unit controlling the electromechanical rotary actuator so that:

c1) if motion of the hub is such that a distance between said hub and the vehicle body tends to decrease with respect to an absolute distance that said hub would have from said vehicle body in a neutral condition of equilibrium of static forces of the suspension, powering the electromechanical rotary actuator with electric current from the battery so as to generate a torque which, transmitted to the suspension arm by the leverage, generates on said suspension arm an action with a maximum frequency F>5 Hz tending to further reduce the distance between the hub and the vehicle body as long as the relative velocity between the hub and the vehicle body does not change sign, in which case cutting off power supply from the battery to the electromechanical rotary actuator, and making said electromechanical rotary actuator work as a generator, transmitting the electric current produced to the battery; and c2) if motion of the hub is such that the distance between said hub and the vehicle body tends to increase with respect to the absolute distance that the hub would have from said vehicle body in the neutral condition of equilibrium of static forces of the suspension, powering the electromechanical rotary actuator with electric current from the battery so as to generate a torque which, transmitted to the suspension arm by the leverage, generates an action with a maximum frequency F>5 Hz on said suspension arm tending to further increase the distance between the hub and the vehicle body as long as the relative velocity between the hub and the vehicle body does not change sign, in which case cutting off power supply from the battery to the electromechanical rotary actuator and making said electromechanical rotary actuator work as a generator, transmitting the electric current produced to the battery.

14. The method as set forth in claim 13, wherein the detecting step is carried out by an angular position sensor, integrated in the electric machine and adapted to allow control of the electric machine in torque and velocity.

15. The method as set forth in claim 13, wherein:

powering the electromechanical rotary actuator with electric current from the battery in step c1) is carried out when the wheel climbs an obstacle, starting from the neutral condition of equilibrium of static forces of the suspension, until the wheel reaches the apex of the obstacle, after which condition power supply from the battery to the electromechanical rotary actuator is cut-off, making said electromechanical rotary actuator work as a generator as far as the wheel descends from the obstacle, until the wheel reaches again the neutral condition of equilibrium of static forces of the suspension; and powering the electromechanical rotary actuator with electric current from the battery in step c2) is carried out when the wheel descends into a dip, starting from the neutral condition of equilibrium of static forces of the suspension, until the wheel reaches the lowest point of the dip, after which condition power supply from the battery to the electromechanical rotary actuator is cut-off, making said electromechanical rotary actuator work as a generator as far as the wheel climbs the dip, until the wheel reaches again the neutral condition of equilibrium of static forces of the suspension.

* * * * *